(12) United States Patent
Fleury et al.

(10) Patent No.: US 9,551,507 B2
(45) Date of Patent: Jan. 24, 2017

(54) PROCESS FOR PRODUCING AN ELEMENT FOR ABSORBING SOLAR RADIATION FOR A THERMAL CONCENTRATING SOLAR POWER PLANT

(75) Inventors: Gatien Fleury, Gréoux-les-Bains (FR); Raphaël Couturier, Sassenage (FR); Christophe Dubarry, Claix (FR); Carole Mollard, Panissage (FR); Olivier Sicardy, Saint-Egrève (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 346 days.

(21) Appl. No.: 14/122,422

(22) PCT Filed: Jun. 7, 2012

(86) PCT No.: PCT/FR2012/000229
§ 371 (c)(1),
(2), (4) Date: Nov. 26, 2013

(87) PCT Pub. No.: WO2012/168577
PCT Pub. Date: Dec. 13, 2012

(65) Prior Publication Data
US 2014/0090639 A1    Apr. 3, 2014

(30) Foreign Application Priority Data

Jun. 9, 2011 (FR) .................................. 11 01773

(51) Int. Cl.
*F24J 2/46*        (2006.01)
*C23C 8/02*       (2006.01)
(Continued)

(52) U.S. Cl.
CPC ................ *F24J 2/4652* (2013.01); *C23C 8/02* (2013.01); *C23C 8/10* (2013.01); *C23C 8/14* (2013.01);
(Continued)

(58) Field of Classification Search
CPC ................ C23C 8/14; C23C 8/18; C23C 8/02; F24J 2002/108; F24J 2/1057; F24J 2/1061; F24J 2/1071; F24J 2/0015; F24J 2/481; F24J 2/487; F24J 2/485
See application file for complete search history.

(56) References Cited

U.S. PATENT DOCUMENTS 2,917,817 A     12/1959  Tabor
3,125,471 A     3/1964   Conner, Jr. et al.
(Continued)

FOREIGN PATENT DOCUMENTS

EP     1 992 716 B1     4/2013
FR     2 325 002 A1     4/1977
(Continued)

OTHER PUBLICATIONS

Avila-Garcia et al; "Thermally and air-plasma-oxidized titanium and stainless steel plates as solar selective absorbers;" Solar Energy Materials & Solar Cells; 2006; vol. 90; pp. 2556-2568.
(Continued)

Primary Examiner — Jason L Vaughan
(74) Attorney, Agent, or Firm — Oliff PLC

(57) ABSTRACT

A solar radiation absorber element for a thermal concentrating solar power plant is achieved by forming a selective coating on an outer surface of a substrate made from stainless steel, chosen from stainless steels presenting an aluminum content of more than 0.5% by weight. Formation of the selective coating includes a surface treatment step of the substrate, by polishing, and a heat treatment step of the
(Continued)

substrate, in an oxidizing atmosphere, in a temperature range included between 550° C. and 650° C. The heat treatment in particular enables at least one intrinsically selective superficial thin layer to be formed on the outer surface of the substrate.

15 Claims, 2 Drawing Sheets

(51) Int. Cl.
  *C23C 8/10* (2006.01)
  *C23C 8/14* (2006.01)
  *C23C 8/18* (2006.01)
  *F24J 2/48* (2006.01)
  *F24J 2/07* (2006.01)
(52) U.S. Cl.
  CPC ............... *C23C 8/18* (2013.01); *F24J 2/487* (2013.01); *F24J 2/07* (2013.01); *Y02E 10/40* (2013.01); *Y10T 29/49355* (2015.01)

(56) References Cited

U.S. PATENT DOCUMENTS

| | | | |
|---|---|---|---|
| 3,210,220 A | | 10/1965 | Clegg et al. |
| 4,079,724 A | * | 3/1978 | Zwillinger ............ F24J 2/1047 126/648 |
| 4,097,311 A | | 6/1978 | Ishibashi et al. |
| 4,268,324 A | | 5/1981 | Sharma |
| 4,416,916 A | | 11/1983 | Aykan et al. |
| 5,188,714 A | * | 2/1993 | Davidson ................. C23C 8/10 148/276 |
| 5,226,968 A | * | 7/1993 | Ohmi ........................ C23C 8/10 118/715 |
| 5,656,099 A | * | 8/1997 | Ohmi ........................ C23C 8/18 148/280 |
| 5,951,787 A | * | 9/1999 | Ohmi ........................ C23C 8/02 148/280 |
| 6,612,898 B1 | | 9/2003 | Ohmi et al. |
| 8,518,234 B2 | * | 8/2013 | Rakowski ............. C22C 38/005 205/640 |
| 8,893,711 B2 | * | 11/2014 | Kennedy ................. F24J 2/055 126/651 |
| 9,187,830 B2 | * | 11/2015 | Yamazaki ................ C21D 8/12 |
| 2013/0059137 A1 | * | 3/2013 | Hevesi .................... C03C 17/36 428/213 |

FOREIGN PATENT DOCUMENTS

| | | |
|---|---|---|
| GB | 2 032 463 A | 5/1980 |
| JP | A 2-44149 | 2/1990 |
| WO | WO 98/42889 A1 | 10/1998 |
| WO | WO 2009/051595 A1 | 4/2009 |

OTHER PUBLICATIONS

Feb. 7, 2013 Search Report issued in International Patent Application No. PCT/FR2012/000229 (with translation).

\* cited by examiner

PROCESS FOR PRODUCING AN ELEMENT FOR ABSORBING SOLAR RADIATION FOR A THERMAL CONCENTRATING SOLAR POWER PLANT

BACKGROUND OF THE INVENTION

The invention relates to a solar radiation absorber element for a thermal concentrating solar power plant, and to its production method, with in particular formation of a selective coating on an outer surface of a stainless steel substrate.

STATE OF THE ART

A thermal concentrating solar power plant (CSP) is a power plant designed to concentrate sun rays by means of mirrors to heat a heat transfer medium. The heat transfer medium then acts as hot source in a thermodynamic cycle for the purposes of producing electricity. Concentration of the solar radiation enables higher temperatures to be reached and a high thermodynamic conversion rate to be achieved.

Different techniques exist for concentrating solar radiation, for transporting and possibly storing the heat and for converting the heat into electricity. In all cases, one of the essential elements of a concentrating solar power plant is the solar radiation absorber element which forms a part of the receiver.

In order to maximize the efficiency of the absorber, the latter generally comprises a coating, called selective coating or selective processing. The selective coating is designed to enable maximum absorption of the incident solar energy while at the same time re-emitting as little infrared radiation as possible (black body principle). In particular, such a selective coating is considered as being perfect if it absorbs all the wavelengths lower than a cut-off wavelength and reflects all the wavelengths higher than this same cut-off wavelength. The optimal cut-off wavelength depends on the operating temperature of the absorber element involved and is in general comprised between 1.5 µm and 2.5 µm. It is for example about 1.8 µm for a temperature of about 650 K.

Different types of selective coatings exist, each in general comprising an anti-reflective layer designed to limit reflection of the incident solar radiation.

In particular, one type of selective coating consists in depositing a material intrinsically possessing the required properties on the surface of the absorber. This type of material is rather rare and that presenting the most efficient is $ZrB_2$, in particular when it is associated with an anti-reflective layer made from $Si_3N_4$, $SiO_2$ or $Al_2O_3$.

Another method consists in structuring the surface of the absorber to create the conditions favourable for absorption (principle of multiple reflection or refractive index gradient, according to the scale of the surface structuring), while at the same time limiting infrared emissions. The major drawback of this type of selective processing is of technological nature: no means exist at present for performing industrial production of a suitable submicron structuring on a large scale.

The selective coating can also consist of an interference filter formed by a stack of several thin layers of carefully controlled thicknesses, typically of a few nanometers. This type of selective processing enables excellent performances to be obtained, but it is relatively difficult to implement.

For example purposes, Patent application WO-A-2009/051595 proposes a solar selective coating of this coating family to cover the outer surface of a solar radiation absorber tube, typically made from stainless steel. The selective coating comprises a stack of several layers each having a function and a thickness determined by optic simulation. In a particular embodiment, the solar radiation absorber tube is successively covered by a succession of bilayers formed by a layer of material reflecting IR radiation and by a layer of material absorbing solar radiation, followed by application of an anti-reflective layer. The solar radiation absorber tube is for example made from stainless steel of austenitic structure, for example of AISI 316, 321, 347 or 304L type.

Finally, another option concerns a non-interferential stack of several thin layers each having a complementary optic function. In general a stack of three layers is made:
 the first layer located at the interface with the substrate acts as infrared mirror,
 the second layer designed to absorb the solar radiation while at the same time having a low infrared emissivity,
 and the third layer having an anti-reflective function.

Numerous solutions enabling high-performance selective processing to be performed according to this principle have been related in the literature. In particular, stacks including anti-diffusive layers exist enabling the duration of said stacks to be lengthened.

All of these types of selective coatings do not enable the requirements of performance and resistance with time to be simultaneously met, in particular in an oxidizing atmosphere. The coatings that are currently commercially available, for high operating temperatures (typically greater than 400° C.), do in fact require the use of a protective enclosure in a vacuum, which both increases manufacturing costs and gives rise to stability problems with time.

OBJECT OF THE INVENTION

The object of the invention tends to propose a solar radiation absorber element, for a thermal concentrating solar power plant, comprising a high-performance selective coating that is durable and stable, not only for operating temperatures of more than 400° C., but also in an oxidizing atmosphere such as air.

According to the invention, this object is achieved by a method for producing a solar radiation absorber element, for a thermal concentrating solar power plant, comprising formation of a selective coating on an outer surface of a stainless steel substrate,
characterized in that formation of the selective coating comprises the following successive steps:
 surface treatment by polishing of the substrate,
 and heat treatment of the substrate, in an oxidizing atmosphere, in a temperature range comprised between 550° C. and 650° C., to form at least one intrinsically selective superficial thin layer on the outer surface of the substrate,
and in that the stainless steel of the substrate is chosen from stainless steels presenting an aluminium content of more than 0.5% by weight.

According to the invention, this object is also achieved by a solar radiation absorber element for a thermal concentrating solar power plant that is able to be obtained by such a production method.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PREFERRED EMBODIMENTS OF THE INVENTION

Figure 1:
FIGS. 1 to 5 schematically represent, in cross-section, different steps of a method for producing a solar radiation absorber element according to the invention.
Figure 2:
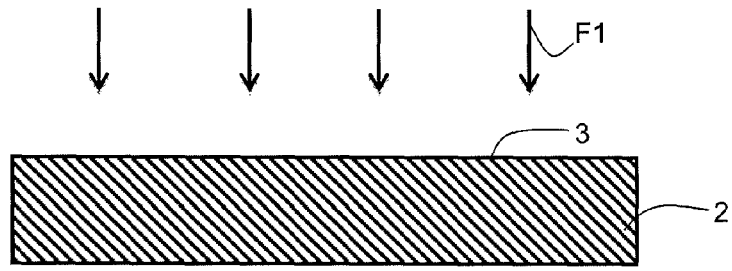
Figure 3:
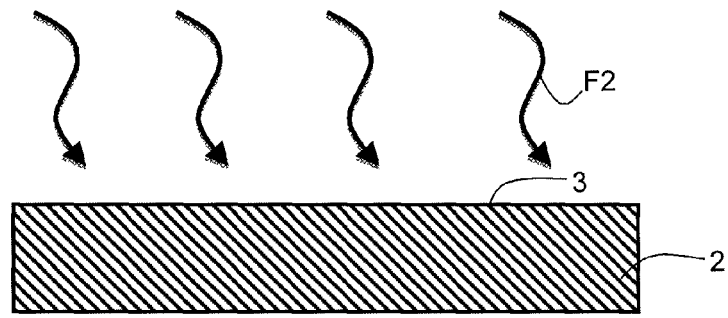
Figure 4:
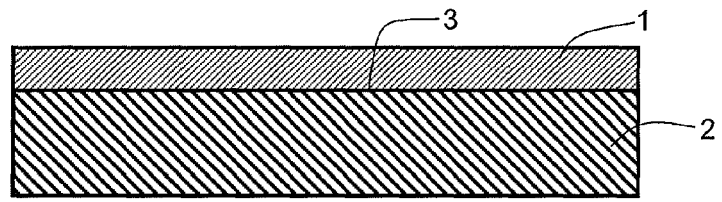
Figure 5:
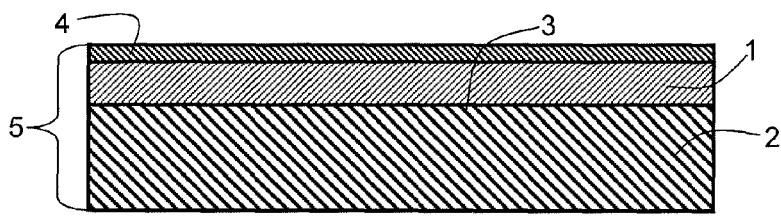

It is proposed to produce a solar radiation absorber element that is particularly suitable for concentrating solar power plants and that remedies the shortcomings of the prior art, by specifically selecting the stainless steel forming part of the composition of the substrate, on which the selective coating is formed.

Particular selection of the stainless steel composing the substrate is in fact performed to enable formation, under particular operating conditions, of an intrinsically selective superficial thin layer on the outer surface of the substrate.

It has in fact been found that the fact that the substrate is composed by a stainless steel presenting an aluminium content of more than 0.5% by weight enables an intrinsically selective superficial thin layer to be formed, under particular operating conditions, on the outer surface of said substrate.

What is meant by intrinsically selective superficial thin layer is a superficial thin layer which, due to its intrinsic nature, is able to absorb a maximum amount of incident solar energy and to re-emit a minimum amount of infrared radiation.

What is meant by aluminium content of a stainless steel is the percentage by weight of aluminium with respect to the total weight of the elements constituting the stainless steel in question. What is involved is the minimum content or percentage generally reported for a particular grade of stainless steel, according to the standards in force and in particular European standard EN 10088-1:2005.

As illustrated in FIGS. 1 to 4, superficial thin layer 1 is in particular obtained by performing the following successive steps on substrate 2:
  surface treatment by mechanical polishing (arrows F1 in FIG. 2) and
  heat treatment (arrows F2 in FIG. 3), in an oxidizing atmosphere (in particular in air that is dry or has a low humidity content), in a temperature range comprised between 550° C. and 650° C.

What is meant by oxidizing atmosphere is in general manner air, air enriched with di-oxygen or air enriched with water. The atmosphere contains at least 5% in volume of an oxygen precursor, for example $O_2$.

Substrate 2, made from stainless steel having a content of more than 0.5%, in particular presents an outer surface 3 on which the selective coating is made. It can be of any type of shape suitable for use as selective solar radiation absorber element, for a concentrating solar power plant (for example a solar power plant of Fresnel or parabolic trough type).

Furthermore, the stainless steel of substrate 2 can more particularly be chosen from stainless steels presenting a chromium content comprised between 15% by weight and 25% by weight. In addition, according to a particular development, the stainless steel of the substrate advantageously presents an aluminium content comprised between 4% by weight and 6% by weight.

The stainless steel is therefore advantageously an alloy of FeCrAl type (iron-based alloy containing chromium and between 4% and 6% by weight of aluminium), that forms part of the family of alumino-forming alloys, i.e. alloys enabling the formation of alumina. Among the steels of FeCrAl type, the steel of numerical designation 1.4767 can be cited, in particular that marketed under the trade name of Aluchrom Y (also known under the Cr Al 22 5 (Y) grade) by ThyssenKrupp VDM. The composition of the steel marketed under the trade name Aluchrom Y is given in the table below. Advantageously, the stainless steel presents a chromium content comprised between 20% by weight and 22% by weight.

TABLE

| | | Ni | Cr | Fe | C | Mn | Si | Al | Ti | Zr | Y |
|---|---|---|---|---|---|---|---|---|---|---|---|
| (% by weight) | Min | — | 20.0 | balance | 0.01 | — | — | 5.0 | 0.01 | 0.01 | 0.05 |
| | Max | 0.30 | 22.0 | | 0.10 | 0.50 | 0.30 | 6.0 | 0.10 | 0.10 | 0.15 |

It should be noted that, according to other particular developments, the stainless steel of substrate 2 can also be chosen:
  from ferritic stainless steels, provided that they comprise an aluminium content of more than 0.5%. The ferritic stainless steels respectively designated by the symbols X10CrAlSi13, X10CrAlSi18, X10CrAlSi25, X3CrAlTi18-2 and X10CrAlSi7, according to the standard EN 10027-1, can be cited.
  from austenitic stainless steels, provided that they comprise an aluminium content of more than 0.5%.

To produce the selective coating covering outer surface 3 of substrate 2, said outer surface 3 is therefore previously polished by means of conventional polishing methods (mechanical, electrolytic, etc.). The polishing operation is symbolized by arrows F1 in FIG. 2. Polishing is in particular performed by mechanical polishing. For example purposes, the mechanical polishing can be performed using a polishing paper of decreasing grain size (from P220 to P1200) and a felt imbibed with a suspension containing the alumina particles particularly having a diameter of 3 µm.

This surface treatment operation by polishing in particular enables the oxidation state of outer surface 3 of substrate 2 to be controlled, before the heat treatment operation, and it has an influence on the emissivity of outer surface 3 in the infrared range.

The roughness Ra of outer surface 3 of substrate 2, after polishing, is preferably comprised between 0.05 µm and 0.4 µm, according to the standard NF ISO 4287, which enables a layer to be obtained presenting a good absorption while at the same time presenting a low emissivity. What is meant by good absorption is an absorption of more than 0.75 and what is meant by low emissivity is an emissivity of less than 0.25. The lower the roughness is, the lower the emissivity and the absorption are. A roughness comprised between 0.05 μm and 0.4 μm enables both a low emissivity and a good absorption of the received solar radiation to be obtained, while at the same time being easily producible from an industrial point of view.

Substrate 2 then undergoes a heat treatment operation to form a superficial thin layer 1 at the interface with outer surface 3 of substrate 2. This heat treatment operation is symbolized by arrows F2 in FIG. 3. This superficial thin layer 1 is in particular obtained by oxidation of certain elements, and in particular of the aluminium, contained in the stainless steel, composing substrate 2. It is therefore essentially composed of oxide. Furthermore, its thickness is very small, typically less than 2 μm. Advantageously, the thickness is more than 70 nm. Superficial thin layer 1 thus presents intrinsically selective properties. More particularly, the thickness of superficial thin layer 1 is comprised between 100 and 1000 nm.

Superficial thin layer 1 is therefore preferably in direct contact with stainless steel substrate 2. This superficial thin layer 1 being formed by oxidation of the substrate, it has an excellent adherence compared in particular with other layers deposited by deposition in thin layers such as for example by physical vapor deposition (PVD) or chemical vapor deposition (CVD).

Furthermore, superficial thin layer 1 can be coated in conventional manner by an anti-reflective layer 4, the whole then forming selective coating 5 of the solar radiation absorber element. Anti-reflective layer 4 is for example a layer of silicon oxide, alumina or silicon nitride. It is for example formed by a vapor deposition technique, such as physical vapor deposition (cathode sputtering or evaporation) or by chemical vapor deposition. This layer will advantageously have a refraction index comprised between 1.5 and 3.5 and advantageously a very low extinction coefficient in order to avoid an increased emissivity. Advantageously, the presence of anti-reflective layer 4 must not increase the emissivity of selective coating 5 of the absorber element by more than 5%. The thickness of this layer is advantageously comprised between 50 nm and 200 nm in order to obtain the best performances.

For example purposes, the outer surface of a steel substrate of numerical designation 1.4767, marketed under the trade name of Aluchrom Y by ThyssenKrupp VDM, was polished by means of a Tegrasystem 21/5 polisher and magnetic polishing disks with a grain varying from P220 to P1200, and then by means of a felt impregnated with an alumina suspension with a grain size of 3 μm. The substrate is then subjected to heat treatment, in dry air, for 48 hours at a temperature of 600° C. The heat treatment operation causes formation of an oxidized superficial thin layer directly on the outer surface of the substrate.

This superficial thin layer presents an intrinsically selective nature. Indeed, as illustrated in FIGS. 6 and 7, once the heat treatment has been performed, the total reflectivity of said substrate was measured over a wavelength range of 320 nm to 20000 nm (Curves B and B').

These reflectivity measurements enable the absorption and emissivity quantities, which are the desired surface properties, to be calculated. The measurements were made in the visible radiation range (0.32 μm-2.5 μm) by means of a Perkin Elmer lambda 950 spectrophotometer which has an integration sphere with a diameter of 150 mm, coated with $BaSO_4$. In the 2.5-25 μm range, the reflectance is measured by means of an Equinox 55 spectrophotometer, manufactured by Bruker and having a gold-coated integration sphere which is highly reflective for these wavelengths.

Figure 6:
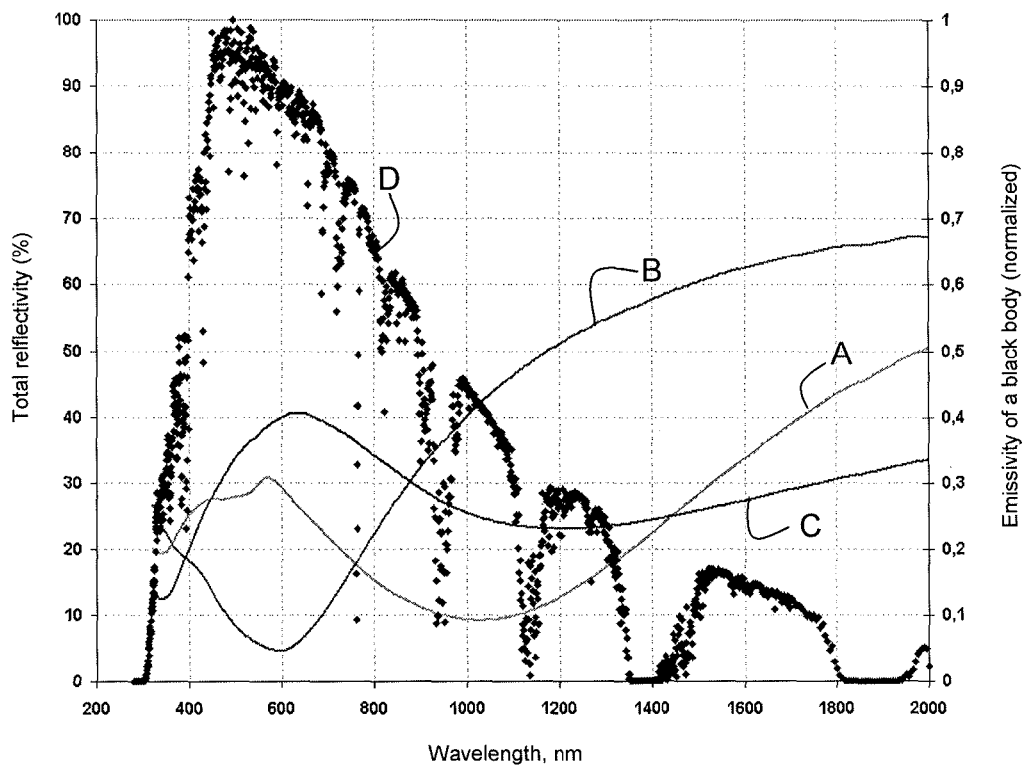
FIG. 6 represents the reflection spectrum over a range of wavelengths comprised between 200 nm and 2000 nm, of a substrate made from Cr Al 22 5 (Y) grade steel, thermally treated after mechanical polishing at respective heat treatment temperatures of 450° C. (Curve A), 600° C. (Curve B) and 800° C. (Curve C), in comparison with the solar spectrum according to the ASTM G173-03 norm (Curve D).
Figure 7:
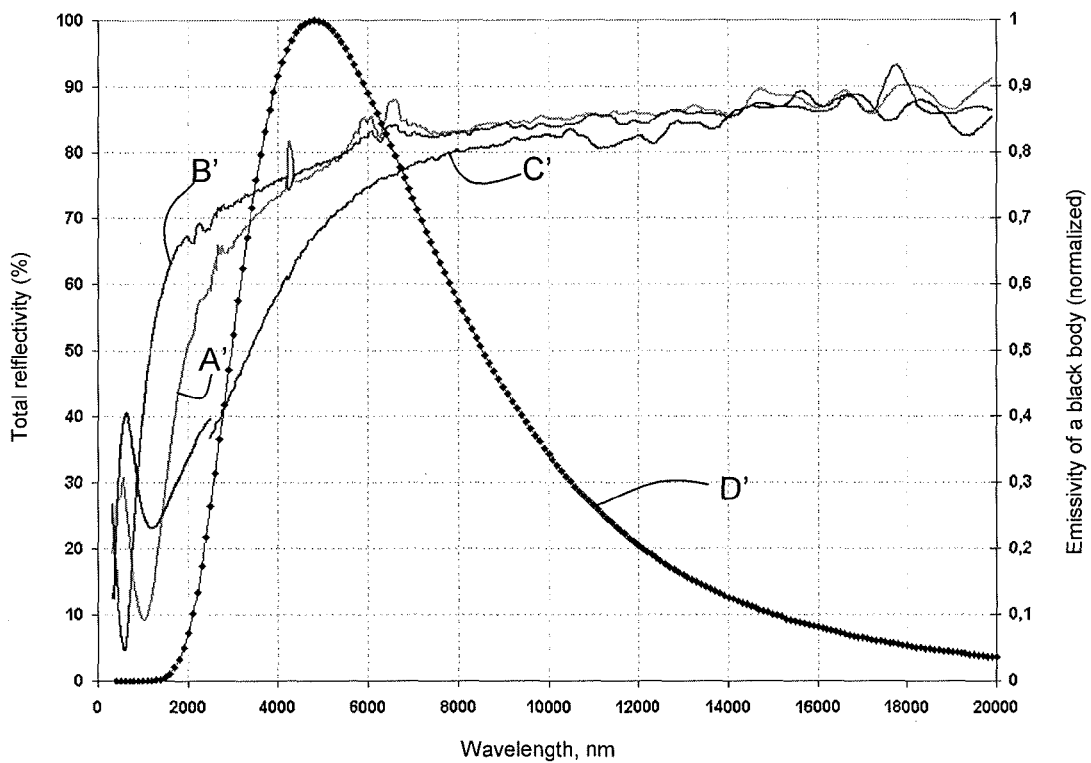
FIG. 7 represents the reflection spectrum over a range of wavelengths comprised between 200 nm and 20000 nm, of a substrate made from Cr Al 22 5 (Y) grade steel, thermally treated after mechanical polishing at respective heat treatment temperatures of 450° C. (Curve A), 600° C. (Curve B) and 800° C. (Curve C), in comparison with that of the black body at 600K (Curve D').

For comparison purposes, the reflection spectra are also given in FIGS. 6 and 7 for two other steel substrates of numerical designation 1.4767, which have been subjected to the same mechanical polishing and the same heat treatment but at different treatment temperatures: 450° C. for the first substrate (curves A and A') and 800° C. for the second substrate (curves C and C'). Furthermore, FIG. 6 comprises the solar spectrum (Curve D) whereas the emissivity spectrum of a black body is represented in FIG. 7 (Curve D').

It can in particular be observed in FIG. 6 that for the substrates that underwent oxidation treatments at 450° C. and 800° C. (curves A and C), the reflectivity around the maximum solar radiation (around 500 nm) is relatively high (respectively about 28% and 35%), whereas the sample oxidized at 600° C. (curve B) has a low reflectivity (~8%) at this wavelength. Furthermore, the substrate that underwent oxidation treatment at 600° C. (curve B') has a higher reflectivity than that of the substrates that were subjected to oxidation treatment at 450° C. and 800° C. (curves A' and C'), at wavelengths of more than 900 nm. A higher reflectivity in the 6000-14000 nm wavelength range further means that a weaker infrared emissivity will be obtained.

It was also observed that the oxide formed at the outer surface of the substrate is an oxide that is stable at higher temperatures than the operating temperatures of the solar radiation absorber element (typically more than 400° C.) and under oxidizing conditions for the substrate (in particular in air). Measurements made by XPS (X-ray photoelectron spectrometry) particularly highlighted the presence of a superficial thin layer composed of iron, aluminium and chromium oxides on the outer surface of the alloy.

In so far as the layer responsible for the good optic properties of the surface was formed at a higher temperature than its operating temperature, the oxide thus obtained, which in particular contains iron and aluminium, is stable during use, including for use in an oxidizing atmosphere.

Formation of such a superficial thin layer thus enables the selective coating, which comprises the latter, to be of high performance, durable and stable for operating temperatures of more than 400° C., typically up to 500° C., and including in an oxidizing atmosphere, in particular in air. Furthermore, production of such a superficial thin layer is easy to implement and inexpensive, as the heat treatment enabling superficial oxidation of the substrate to be achieved is a treatment that is simple to set up on an industrial scale.

It is also proposed to produce a concentrating solar power plant by means of a method comprising the following steps:
  providing a stainless steel substrate 2 having an outer surface 3 covered by a coating 5 selective to solar radiation, substrate 2 being designed to have a heat exchange fluid flowing through it, for example the substrate is in the form of a tube,
  providing a mirror arranged to concentrate a part of the solar radiation received on substrate 2.

According to a preferred embodiment, the method for producing a concentrating solar power plant also comprises the following steps:
  providing a stainless steel substrate 2 having an aluminium content of more than 0.5% by weight,
  polishing the outer surface 3 of the substrate,
  forming an oxide on the polished outer surface 3 of substrate 2 by means of heat treatment comprised between 550° C. and 650° C. in an oxidizing atmosphere so that the oxide is intrinsically selective to solar radiation.

The invention claimed is:

1. A method for producing a solar radiation absorber element, for a thermal concentrating solar power plant, comprising formation of a selective coating on an outer surface of a stainless steel substrate,
wherein the formation of the selective coating comprises the following successive steps:
surface treatment by polishing of the stainless steel substrate,
and heat treatment of the stainless steel substrate, in an oxidizing atmosphere containing at least 5% in volume of an oxygen precursor, in a temperature range comprised between 550° C. and 650° C., to form on the outer surface of the stainless steel substrate at least one intrinsically selective superficial thin layer having a thickness of more than 70 nm so as to be intrinsically selective,
and wherein the stainless steel of the substrate presents an aluminum content of more than 0.5% by weight.

2. The method according to claim 1, wherein the stainless steel of the substrate is chosen from stainless steels presenting a chromium content comprised between 15% by weight and 25% by weight.

3. The method according to claim 2, wherein the stainless steel of the substrate is chosen from stainless steels presenting a chromium content comprised between 20% by weight and 22% by weight.

4. The method according to claim 2, wherein the stainless steel of the substrate presents an aluminum content comprised between 4% by weight and 6% by weight.

5. The method according to claim 4, wherein the stainless steel of the substrate is a steel of FeCrAl type.

6. The method according to claim 1, wherein the stainless steel of the substrate is a ferritic stainless steel.

7. The method according to claim 6, wherein the stainless steel of the substrate is chosen from ferritic stainless steels respectively designated by the symbols X10CrAlSi13, X10CrAlSi18, X10CrAlSi25, X3CrAlTi18-2 and X10CrAlSi7.

8. The method according to claim 1, wherein the stainless steel of the substrate is an austenitic stainless steel.

9. The method according to claim 1, wherein the intrinsically selective superficial thin layer has a thickness comprised between 100 nm and 1000 nm.

10. The method according to claim 1, wherein the roughness of the outer surface of the stainless steel substrate, after polishing, is comprised between 0.05 μm and 0.4 μm.

11. The method according to claim 1, wherein the formation of the selective coating comprises a step of formation of an anti-reflective layer on the intrinsically selective superficial thin layer.

12. The method according to claim 1, wherein the oxygen precursor is $O_2$ or water.

13. A method for producing a thermal concentrating solar power plant comprising the following steps:
providing a stainless steel substrate having an outer surface covered by a coating selective to solar radiation, the stainless steel substrate being designed to have a heat exchange fluid flowing through it,
providing a mirror arranged to concentrate a part of the solar radiation received on the stainless steel substrate, said method comprising the following steps:
providing a stainless steel substrate having an aluminum content of more than 0.5% by weight,
polishing the outer surface of the substrate,
forming an oxide on the polished outer surface of the stainless steel substrate by means of heat treatment comprised between 550° C. and 650° C. in an oxidizing atmosphere, containing at least 5% in volume of an oxygen precursor, so that the oxide is intrinsically selective to solar radiation.

14. The method according to claim 13, wherein the oxygen precursor is $O_2$ or water.

15. The method according to claim 13, further comprising forming an anti-reflective layer on the oxide.

* * * * *